United States Patent
Itoh

(10) Patent No.: US 7,783,080 B2
(45) Date of Patent: Aug. 24, 2010

(54) IMAGE PROCESSING APPARATUS, IMAGE PROCESSING METHOD, AND STORAGE MEDIUM READABLE BY COMPUTER

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1003 days.

(21) Appl. No.: 11/332,146

(22) Filed: Jan. 17, 2006

(65) Prior Publication Data

US 2006/0290968 A1 Dec. 28, 2006

(30) Foreign Application Priority Data

Jun. 23, 2005 (JP) .............................. 2005-182847

(51) Int. Cl.
*G06K 9/00* (2006.01)
*G06K 15/00* (2006.01)
(52) U.S. Cl. ..................................... 382/112; 358/1.14
(58) Field of Classification Search ................. 382/112, 382/164–165, 181, 185–188, 202, 224–225, 382/236, 309, 162; 715/513–514, 517; 707/101, 707/500, 502; 705/1; 358/1.14, 530–540, 358/504; 250/559.01–559.2; 708/1.14, 530–540; 702/37

See application file for complete search history.

(56) References Cited

U.S. PATENT DOCUMENTS

| 6,043,823 | A * | 3/2000 | Kodaira et al. .............. 345/619 |
| 6,088,709 | A | 7/2000 | Watanabe |
| 7,218,783 | B2 * | 5/2007 | Bargeron et al. ............ 382/188 |
| 2003/0237046 | A1 * | 12/2003 | Parker et al. ................ 715/513 |
| 2004/0019499 | A1 * | 1/2004 | Murashita ....................... 705/1 |
| 2005/0276439 | A1 * | 12/2005 | Ishii ............................ 382/100 |

FOREIGN PATENT DOCUMENTS

| JP | A 8-95965 | 4/1996 |
| JP | A 10-255027 | 9/1998 |
| JP | A 2001-283231 | 10/2001 |
| JP | A 2003-143394 | 5/2003 |
| JP | A 2003-264685 | 9/2003 |
| JP | A 2004-201243 | 7/2004 |

OTHER PUBLICATIONS

Notice of Reasons for Refusal issued in Japanese Patent Application No. 2005-182847; mailed Mar. 9, 2010; with English-language translation.

* cited by examiner

*Primary Examiner*—Samir A. Ahmed
*Assistant Examiner*—Mehdi Rashidian
(74) *Attorney, Agent, or Firm*—Oliff & Berridge, PLC

(57) ABSTRACT

An image processing apparatus includes: a change region judging unit that performs a judging process including a pixel area discriminated to represent additional writing information on a change region according to input image data; a change region state judging unit that performs image analysis on an area judged by the change region judging unit to be a change region, and that judges presence/absence of additional writing information to be used to tamper; a warning display control unit adapted to set a display mode according to a result of judgment to enable additional writing information, which is highly likely to tamper, to be discriminated; and a display unit that performs an output data displaying process according to the display mode set by the warning display control unit.

18 Claims, 12 Drawing Sheets

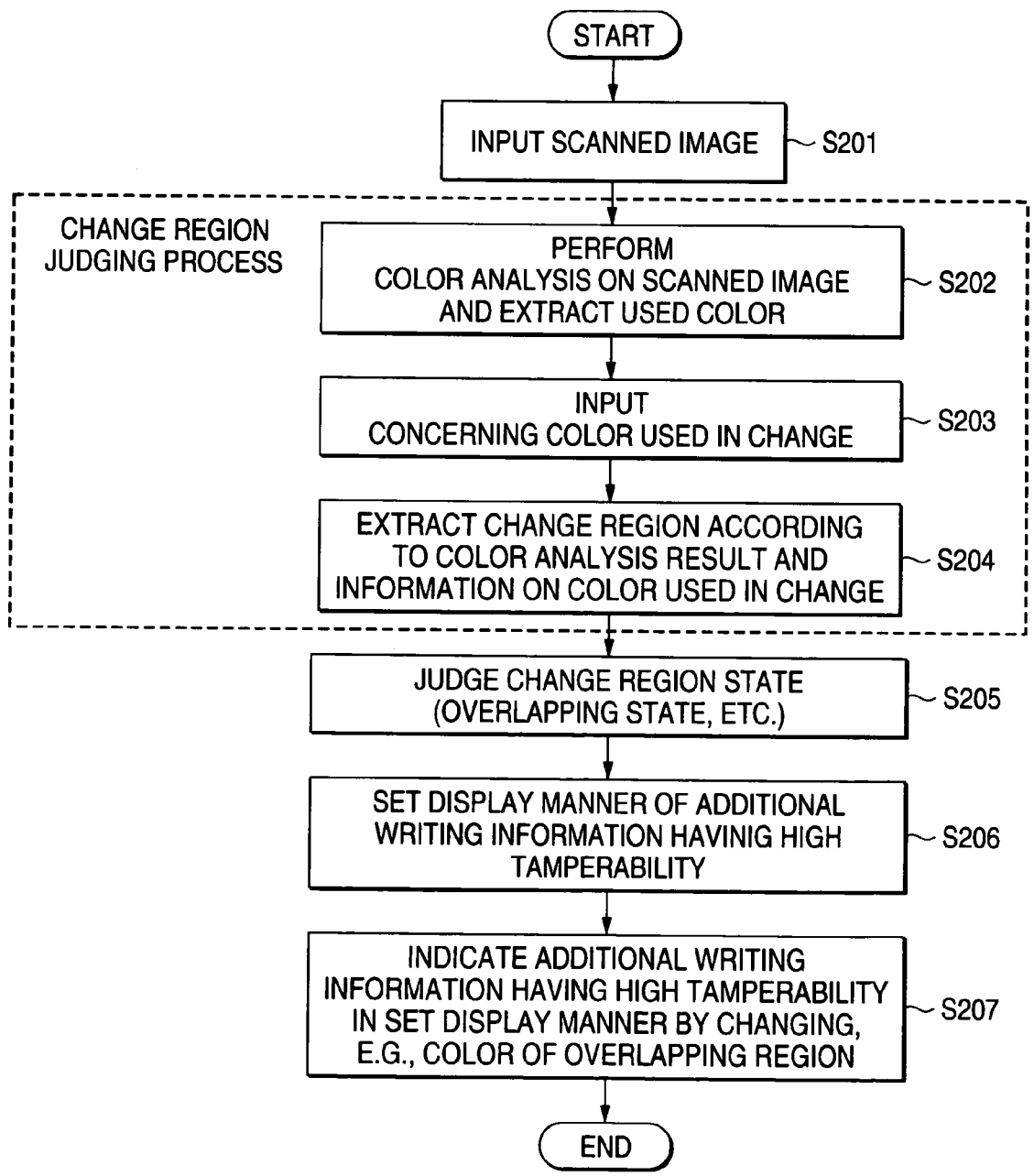

IMAGE PROCESSING APPARATUS, IMAGE PROCESSING METHOD, AND STORAGE MEDIUM READABLE BY COMPUTER

CROSS-REFERENCE TO RELATED APPLICATION

This application is based on and claims the benefit of priority from the prior Japanese Patent Application No. 2005-182847, filed on Jun. 23, 2005; the entire contents of which are incorporated herein by reference.

BACKGROUND OF THE INVENTION

1. Field of the Invention

The present invention relates to an image processing apparatus, an image processing method, and a storage medium readable by computer. More particularly, the present invention relates to an image processing apparatus, an image processing method, and a storage medium readable by computer, which are enabled to extract change information concerning an additional writing, such as a memorandum, made on a document including a text and image data, for example, a printed-out document, and also enabled to analyze a part of the document, which part may be tampered by the change information, and also enabled to issue a warning.

2. Description of the Related Art

In the field of image processing, various studies and developments have been made on the processes of extracting additional writing information on a memorandum written by a user into a document outputted from, for example, a printer or a FAX and of verifying whether the security document is tampered. Generally, in the processes of extracting the additional writing information and verifying the tampering of the document, an operation of comparing original document data with data representing an output document on which an additional writing or the like may be performed.

For example, JP-A-10-255027 discloses an apparatus configured to retain data representing an original document and a new manuscript document as data representing electronic documents and to extract the difference between these electronic documents to thereby extract additional writing information.

Further, JP-A-2003-264685 discloses an apparatus and method configured to detect change information in a case where additional writing and alteration are performed, and to judge whether the change information is tampered information. Furthermore, JP-A-2001-283231 discloses an apparatus configured to set an additional-writing inhibiting area set on paper and also configured not to take in additional writing information onto the additional-writing inhibiting area as image information, thereby preventing the apparatus from taking in unnecessary data and from performing unnecessary data-updating.

However, additional writings added to a document include writings made to tamper the document, in addition to ordinary writings such as a mere memorandum or comment. Conventional additional writing detection systems including the related art are configured to extract additional writing information and not to analyze whether the extracted additional writing information aims at tampering with a document.

SUMMARY OF THE INVENTION

The present invention has been made in view of the above circumstances and provides an image processing apparatus, an image processing method, and a storage medium readable by computer, which are enabled to extract change information concerning an additional writing, such as a memorandum, made on a document including a text and image data, for example, a printed-out document, and also enabled to analyze a part of the document, which part may be tampered by the change information, and also enabled to issue a warning.

In a first aspect of the invention, there is provided an image processing apparatus including: a change region judging unit that performs a judging process on a change region according to input image data, the judging process including a pixel area discriminated to represent additional writing information; a change region state judging unit that performs image analysis on an area judged by the change region judging unit to be a change region, and that judges presence/absence of additional writing information to be used to tamper; a warning display control unit adapted to set a display mode according to a result of judgment to enable additional writing information, which is highly likely to tamper, to be discriminated; and a display unit that performs an output data displaying process according to the display mode set by the warning display control unit.

In a second aspect of the invention, there is provided An image processing method including performing a judging process on a change region, which includes a pixel area discriminated to represent additional writing information, according to input image data; performing image analysis on a change region detected as a result of the judgment process; and judging presence/absence of additional writing information to be used to tamper; setting a display mode according to a result of the judgment process to enable highly temperable additional writing information to be discriminated; and performing an output data displaying process according to the display mode.

According to a third aspect of the invention, there is provided A storage medium readable by a computer, the storage medium storing a program of instructions executable by the computer to perform a function for performing image processing, the function, comprising: performing a judging process on a change region, which includes a pixel area discriminated to represent additional writing information, according to input image data; performing image analysis on a change region detected as a result of the judgment process; and judging presence/absence of additional writing information to be used to tamper; setting a display mode according to a result of the judgment process to enable highly temperable additional writing information to be discriminated; and performing an output data displaying process according to the display mode.

Further objects, features, and advantages of the invention will become apparent from the following detailed description of embodiments with reference to the attached drawings. Incidentally, in the present specification, a "system" is defined as a logical set of a plurality of devices, and is not limited to a system, the devices of which are placed in the same casing.

BRIEF DESCRIPTION OF THE DRAWINGS

These and other objects and advantages of this invention will become more fully apparent from the following detailed description taken with the accompanying drawings in which:

FIGS. 8A to 8C are explanatory views illustrating examples of the organization of display data outputted by the image processing apparatus according to the embodiment;

FIG. 11 is a flowchart illustrating a processing sequence performed by the image processing apparatus according to the embodiment.

DESCRIPTION OF THE EMBODIMENTS

Hereinafter, an image processing apparatus, an image processing method and a storage medium readable by computer (hereinafter, referred to as "a computer program") according to an embodiment are described in detail with reference to the accompanying drawings.

Figure 1:
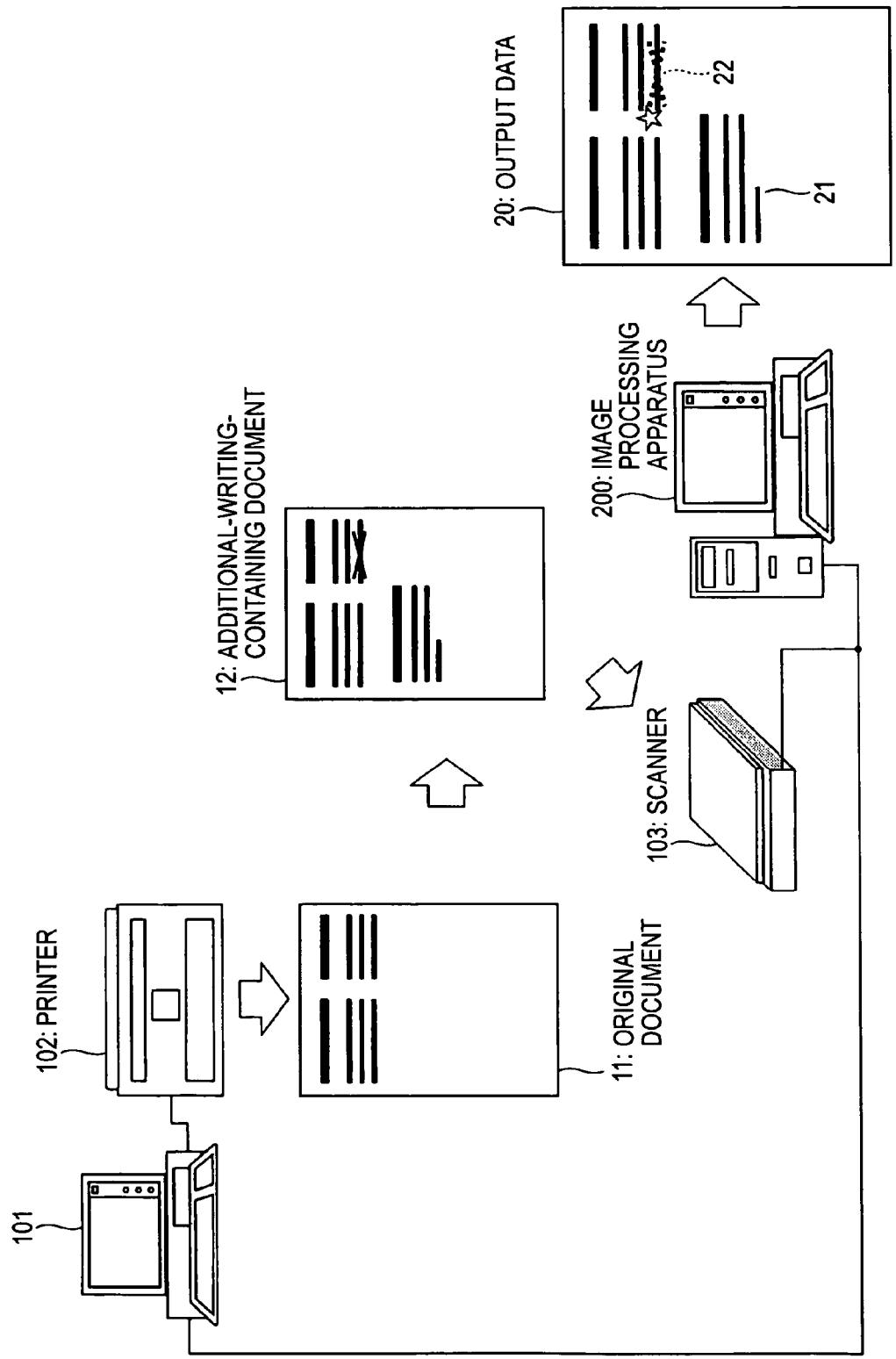
FIG. 1 is an explanatory view illustrating an outline of a process an image processing apparatus according to an embodiment.

First, an outline of a process, to which the image processing apparatus according to the embodiment is applied, is described by referring to FIG. 1. An original document 11 shown in FIG. 1 is, for example, a document serving as a paper medium, to which electronic data stored in an information processing apparatus 101 such as a PC is outputted through a printer 102. The original document 11 is read by a data reading apparatus, for instance, a scanner and is then stored in a storage portion of the information processing apparatus 101. The original document 11 may be represented by either image data or text data. The original document 11 may be taken in by, for instance, an OCR as data on which text analysis has been conducted.

Incidentally, the original document may be not only a document read by the data reading apparatus such as a scanner but a document represented by electronic data that is generated in the information processing apparatus 101 such as a PC and that is stored in a database in a hard disk or the like. The original document may be generated by a document creating application program to which attributes represented by attribute data such as layout information are imparted.

Document data stored in the database in a hard disk or the like of the information processing apparatus 101 is outputted through the printer 102 as the original document 11, and is distributed to users. An output document outputted by the printer is the original document 11 shown in this figure.

Users perform additional writing on the original document 11. The additional writing includes writing that aims at tampering with the original, in addition to mere memorandums and comments. Documents obtained by performing such various kinds of additional writing on the original document are herein referred to as additional-writing-containing documents 12. The additional-writing-containing document 12 is read by utilizing the scanner 103. Data representing the read document is stored in an image processing apparatus 200.

The image processing apparatus 200 is adapted to perform comparison between both data, which represents the additional-writing-containing document 12 obtained through the scanner 103, and data that represents the original document 11 from the information processing apparatus 101 through, for example, a network and to extract the difference therebetween. Thus, the image processing apparatus 200 generates output data 20 and presents a result of analysis through a display or the like. Alternatively, the image processing apparatus 200 outputs data, which represents a result of the analysis, through a printer (not shown). Incidentally, in a case where original document data cannot be obtained, additional writing information is extracted only from an additional-writing-containing document. Such processing will be described later.

The image processing apparatus 200 according to the embodiment performs not only extraction of additional writing information from the additional-writing-containing document 12 but verifies the tamperability of the extracted additional writing information. Then, this image processing apparatus extracts the additional writing information judged to be highly likely to tamper an original, and presents the highly tamperable additional writing information in distinction from other kinds of additional writing information. In the example shown in this figure, between two pieces 21 and 22 of additional writing information included in the output data 20, the additional writing information 22 indicated by an X-mark represents an additional writing judged to be highly likely to tamper the original. For example, the X-mark indicating the additional writing information 22 is displayed in a color (for instance, red) differing from colors used in displaying the other additional writing information 21. Alternatively, a distinguishing mark, such as an asterisk shown in this figure, is displayed. This indication warns users that this additional writing represented by the additional writing information 21 is highly likely to tamper the original.

An example of a practical process performed by the image processing apparatus 200 according to the embodiment is described below by referring to FIG. 2.

Figure 2:
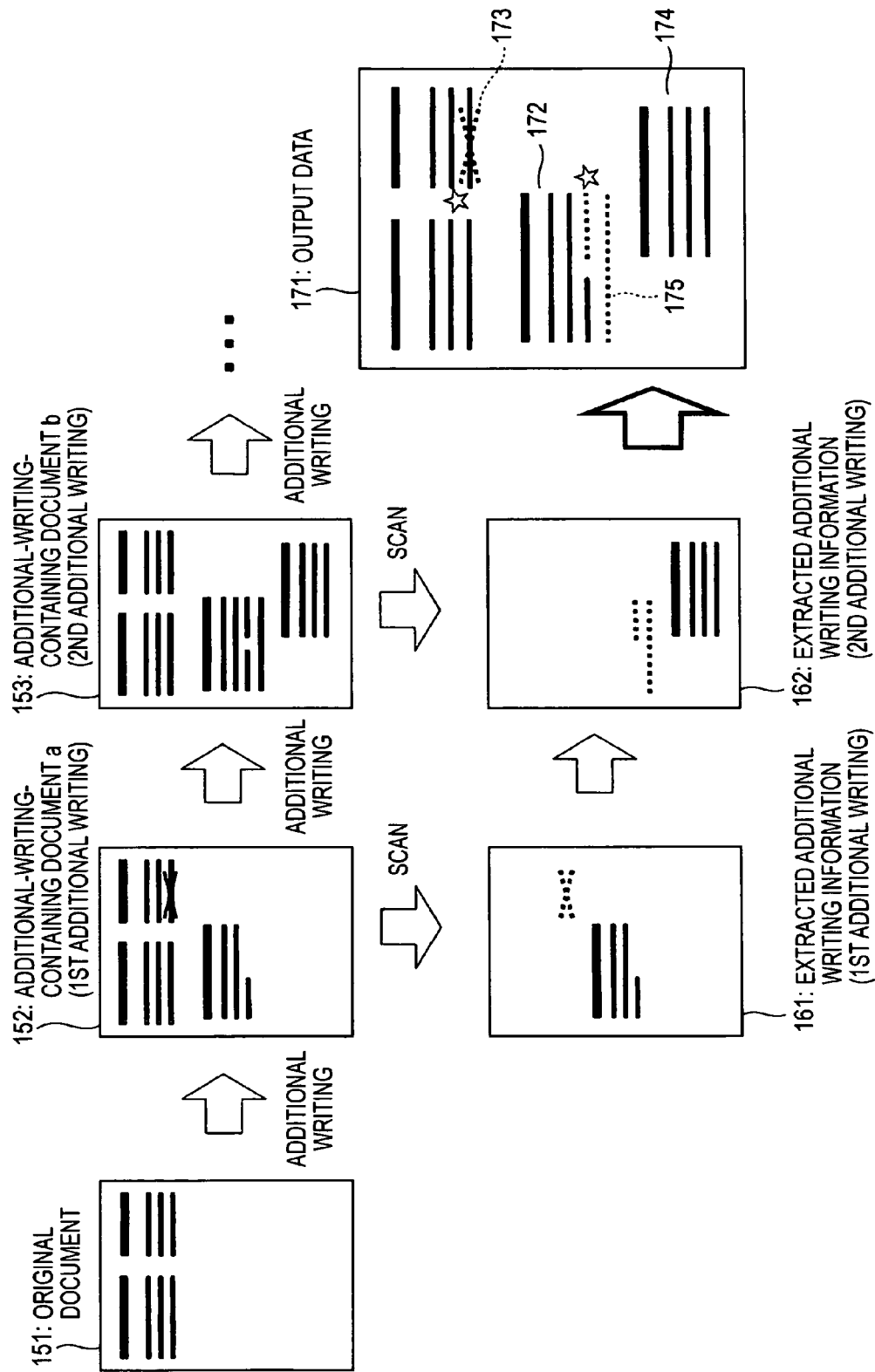
FIG. 2 is an explanatory view illustrating an outline of a process and documents according to the embodiment.

An upper part of FIG. 2 shows an original document 151 to which no additional writings are added, an additional-writing-containing document a 152, and an additional-writing-containing document b 153. The additional-writing-containing document a 152 includes additional writing information added by a user to which the original document 151 is taken. The additional-writing-containing document b 153 is a document obtained by adding a new additional writing to the additional-writing-containing document a 152.

This figure shows the additional-writing-containing document a 152 (corresponding to first additional writing) and the additional-writing-containing document b 153 (corresponding to second additional writing). Further, another additional document (corresponding to third additional writing) may be present.

For example, the original document 151 is stored in the image processing apparatus 200 as electronic data. Also, each of the additional-writing-containing document a 152 (corresponding to first additional writing) and the additional-writing-containing document b 153 (corresponding to second additional writing) is stored in the image processing apparatus 200 as electronic data (for instance, scanned image data) by causing, for example, a scanner to perform scanning.

The image processing apparatus 200 performs extraction of additional writing information according to such a plurality of data. Extracted additional writing information 161 shown in this figure is generated according to difference information representing the difference between the original document 151 and the additional-writing-containing document a 152. Also, extracted additional writing information 162 shown in this figure is generated according to difference information representing the difference between the original document 151 and the additional-writing-containing document b 153 as residual data obtained by deleting data represented by the extracted additional writing information 161. Further, the extracted additional information 162 can be generated according to difference information representing the difference between the additional-writing-containing document a 152 and the additional-writing-containing document b 153. Incidentally, in a case where past document data, from which the difference is extracted, cannot be obtained, additional writing information may be extracted only from the document from which additional writing information is extracted. Such processes will be described later.

The image processing apparatus 200 according to the embodiment performs not only extraction of additional writing information but verifies the tamperability of the original by the extracted additional writing information. Then, this image processing apparatus extracts the additional writing information judged to be highly likely to tamper the original, and presents the highly tamperable additional writing information in distinction from other kinds of additional writing information.

In the example shown in FIG. 2, among pieces of additional writing information 172 to 175 included in output data 171, the pieces of the additional writing information 172 and 173 are extracted according to the additional-writing-containing document a 152 (corresponding to the first additional writing). The pieces of the additional writing information 174 and 175 are extracted according to the additional-writing-containing document b 153 (corresponding to the second additional writing). In a case where the pieces of the additional writing information 173 and 175 are judged to be highly likely to tamper the original, among the pieces of the additional writing information, for example, the pieces of the additional information 173 and 175 are indicated in a color (for instance, red) differing from a color used to indicate the other pieces of the additional information 172 and 174. Alternatively, a distinguishing mark such as an asterisk shown in this figure is displayed. Thus, the image processing apparatus performs an operation of indicating the highly tamperable additional writing information in distinction from other kinds of additional writing information. With this configuration, the image processing apparatus warns a user that the pieces of the additional writing information 173 and 175 are highly likely to tamper the original.

Figure 3:
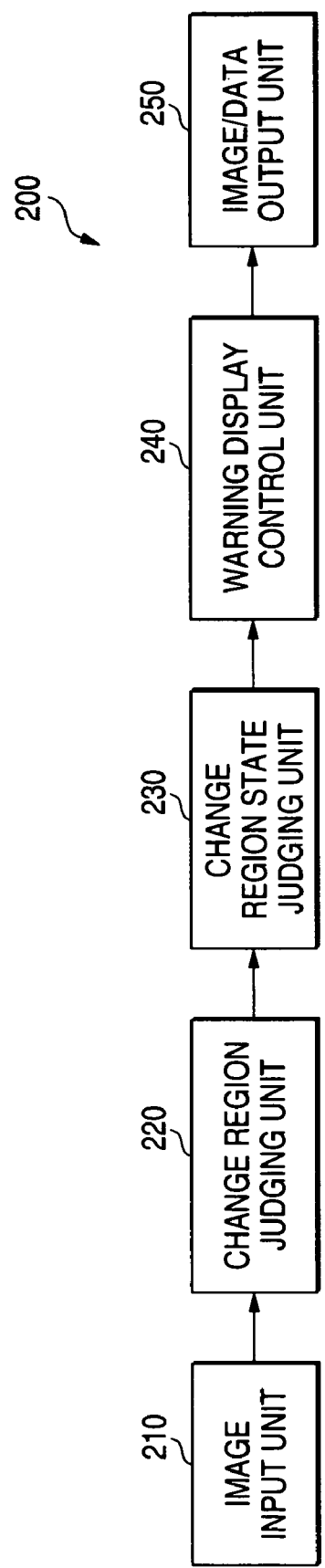
FIG. 3 is a view illustrating the configuration of an image processing apparatus according to the embodiment.

Next, the configuration and operations of the image processing apparatus 200 according to the embodiment are described below by referring to FIG. 3 and so on. FIG. 3 is a block view illustrating the configuration of the image processing apparatus 200 according to the embodiment. The image processing apparatus 200 includes an image input unit 210, a change region judging unit 220, a change region state judging unit 230, a warning display control unit 240, and an image/data output unit 250.

The image input unit 210 is adapted to input image data to be analyzed, for example, data representing an additional-writing-containing document, alternatively, data representing an original document and an additional-writing-containing document. Such data is inputted from, for example, a scanner or from a database provided in a hard disk. Incidentally, data representing input documents includes various data, such as image data, text data, and attribute data containing layout information.

Document data inputted to the document input unit 210 is inputted to the change region judging unit 220. The change region judging unit 220 is adapted to perform a process of selecting image data required to extract additional writing information and obtaining the additional writing information.

Figure 4:
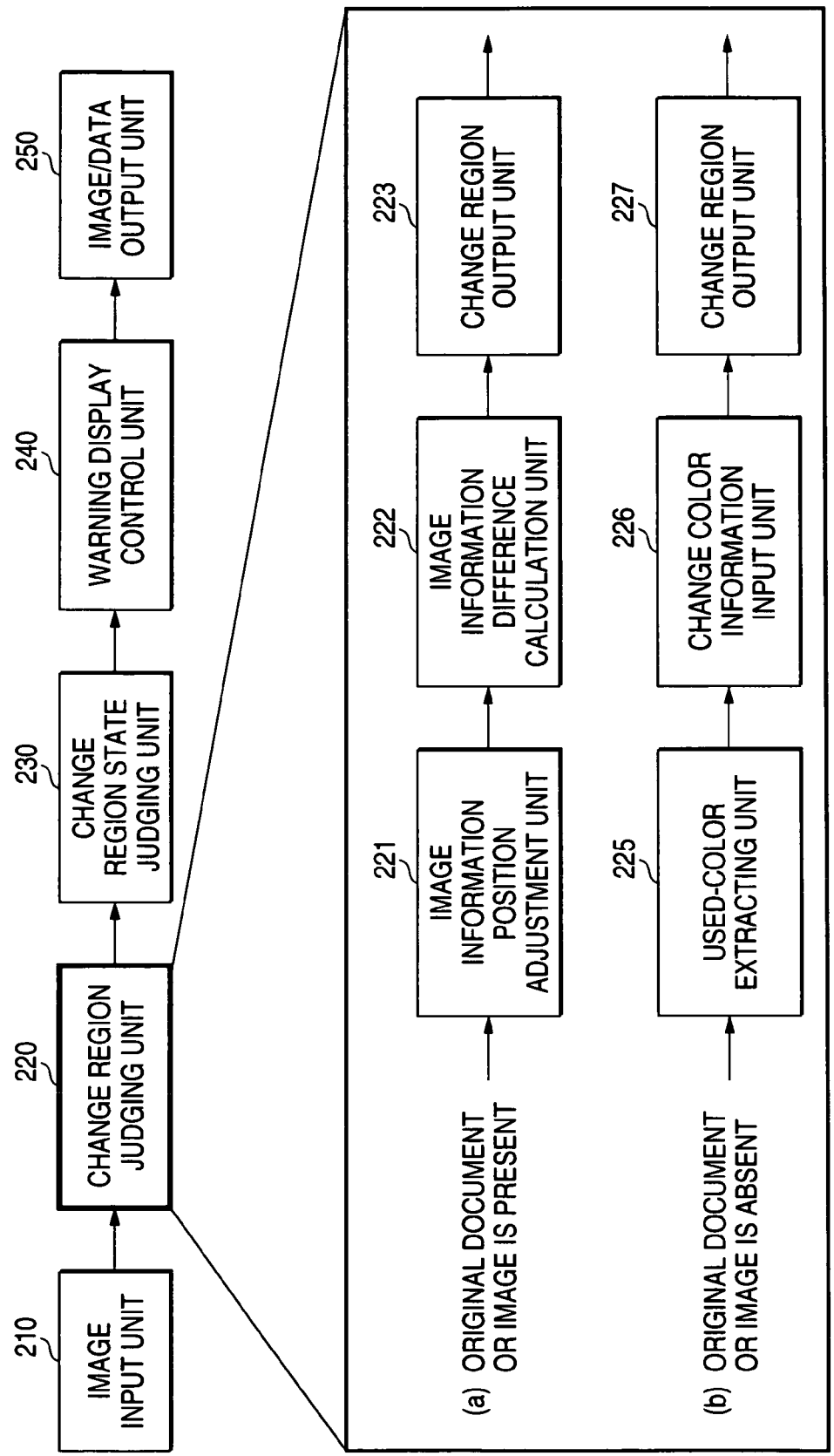
FIG. 4 is an explanatory view illustrating the detail configuration of a change region judging unit of the image processing apparatus according to the embodiment.

The detail configuration of the change region judging unit 220 is described below by referring to FIG. 4. As shown in FIG. 4, the processing configuration of the change region judging unit 220 varies with the following cases (a) and (b):

(a) an original document or an original image is present; and (b) an original document or an original image is absent.

First, the case (a), in which an original document or an original image is present, is described below. In the case where the original document or the original image is present, the extraction of the difference between two images, that is, the original document image and the additional-writing-containing document-image is performed.

First, an image information position adjustment unit 221 performs the position adjustment between the two images, that is, the original document image and the additional-writing-containing document image. Various existing techniques can be applied as the technique of adjusting the positions of the two images. Basically, such a technique is performed by extracting similar characteristic regions from the images and associating the similar characteristic regions with one another. Then, an amount of displacement between the two images is calculated according to the associated characteristic regions. The position adjustment is performed according to the amount of displacement while the image data is corrected.

An image information difference calculation unit 222 performs a process of extracting the difference between the original document image data and the additional-writing-containing document image data respectively corresponding to the two images, the positions of which are adjusted. This process is similar to the related process. For example, the presence or absence of the difference between the coordinate positions (x, y) represented by the original document image data and the associated coordinate positions (x, y) represented by the additional-writing-containing document image data is detected. Further, only in a case where the difference therebetween is present, data extraction is performed by using the difference as the additional writing information.

A change region output unit 223 is adapted to select a region which includes the additional writing information extracted by the image information difference calculation unit 222, and adapted to output information representing the selected region. Extraction of a difference pixel that is a pixel at which difference information is present, or the extraction of a region, such as a rectangular region including such a difference pixel, according to a predetermined region selection algorithm is performed as this region extraction. Region data representing the extracted region including the difference pixel is outputted to the change region state judging unit 230.

Next, a process to be performed by the change region judging unit 220 in the case (b), in which an original document or an original image is absent, is described below. In the case where the original document or the original image is absent, the extraction of the difference between the original document image and the additional-writing-containing document image cannot be performed. Therefore, a process of extracting data, which is judged as additional writing information, only from an additional-writing-containing document is performed. Incidentally, it is now assumed that the additional writing information is recorded in a color differing from a color used for recording the original document. Thus, the extraction of additional writing information is performed by utilizing color judgment. Practically, for example, in a case where the original document is monochromatic print data, and where additional writing information representing an additional writing included in an additional-writing-containing document is red, the extraction of the additional writing information is performed by extracting red data from the additional-writing-containing document.

A used-color extracting unit 225 first performs image analysis (or color analysis) on the additional-writing-containing document to thereby extract a color used in the additional-writing-containing document. For instance, a result of the analysis, which represents black or red, is obtained.

Subsequently, a change color information input unit 226 inputs color information as additional writing information to be identified. For example, color information representing red is inputted by an operator. Incidentally, the change color information input unit 226 may be set so that color information representing a color other than black is judged as additional writing information, instead of inputting color information by a user. In the case of this configuration, it is unnecessary to externally input color information.

A change region output unit 227 extracts a pixel having a designated color from an additional-writing-containing document according to a result of the image analysis (or the color analysis) performed on the additional-writing-containing document by the used-color extracting unit 225 and to the color information inputted by the change color information input unit 226 or to the preliminarily set color information. Alternatively, the change region output unit 227 extracts a rectangular region including a pixel having a designated color. The change region output unit 227 performs the extraction of a change region according to the predetermined region selection algorithm. Data representing the extracted region is outputted to the change region state judging unit 230.

Figure 5:
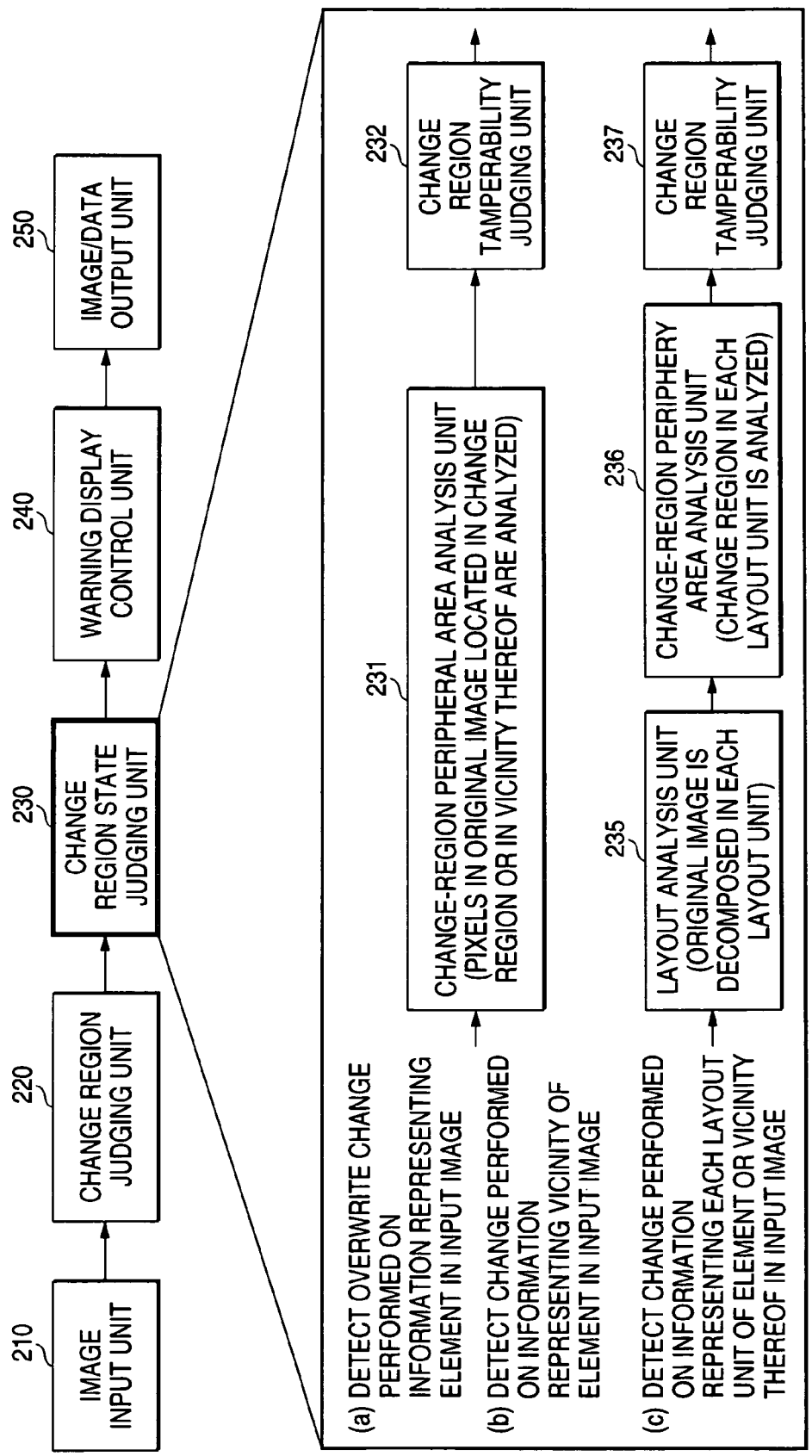
FIG. 5 is an explanatory view illustrating the detail configuration of a change region state judging unit of the image processing apparatus according to the embodiment.

Next, a process performed by the change region state judging unit 230 is described below by referring to FIG. 5. As illustrated in FIG. 5, there are the following detection modes (a), (b), and (c) serving as the processing modes of the change region state judging unit 230:

(a) the judging unit 230 detects a case where an over write change is performed on information representing an element in an input image;

(b) the judging unit 230 detects a change performed on information representing the vicinity of an element in an input image; and (c) the judging unit 230 detects a change performed on information representing each layout-unit of an element or the vicinity thereof in an input image. The processes performed in the cases (a) and (b) are to detect changes due to the overwrite and the additional writing, which are performed on the information representing an element, for example, a character or a figure in an input image, in units of such information. Judgment processing is performed by a change-region peripheral area analysis unit 231 and a change region tamperability judging unit 232 shown in FIG. 5. A process performed in the case (c) is to detect a change performed on information representing each layout unit of the element or the vicinity thereof in the input image. The process configuration of the change region state judging unit 230 is adapted to analyze the additional writing information in each layout unit detected by analysis of regions such as a character region and a photograph region. In the case of performing the process corresponding to the case (c), the judgment process is performed by a layout analysis unit 235, a change-region peripheral area analysis unit 236, and a change region tamperability judging unit 237 shown in FIG. 5.

Incidentally, it is sufficient to perform at least one of the judgment process to be performed by each of the change region peripheral area analysis unit 231 and the change region tamperability judging unit respectively corresponding to the cases (a) and (b) and the judgment process to be performed by using the layout analysis unit 235, the change region peripheral area analysis unit and the change region tamperability judging unit as the process performed by the change region state judging unit 230.

First, the judgment process to be performed by each of the change region peripheral area analysis unit 231 and the change region tamperability judging unit respectively corresponding to the cases (a) and (b) is described below.

The change region peripheral area analysis unit 231 performs a process of analyzing a change region, which includes the additional writing information detected by the change region judging unit 220, or analyzing a pixel placed in the original image disposed in the vicinity of the change region.

A practical example of the judgment process is described below by referring to FIG. 6. For example, it is assumed that an additional-writing-containing document 302 corresponding to an original document 301 is present, and that pieces of additional writing information 311 to 313 are extracted as the additional writing information extracted from the additional-writing-containing document. The extraction of the additional writing information is performed at the change region judging unit 220.

The change region peripheral area analysis unit 231 performs a process of analyzing a change region, which includes the pieces of the additional writing information 311 to 313 detected by the change region judging unit 220, or analyzing a pixel placed in the original image disposed in the vicinity of the change region. The change region peripheral area analysis unit 231 performs the following two operations:

(1) an overlapping portion between the original image and the change region is detected; and (2) original information representing original data, which is present in the change region or the vicinity thereof, is analyzed. According to results of the detection and the analysis, the change region tamperability judging unit 232 judges the tamperability of the additional writing information, that is, the possibility that the additional writing represented by the additional writing information tampers the original.

Figure 6:
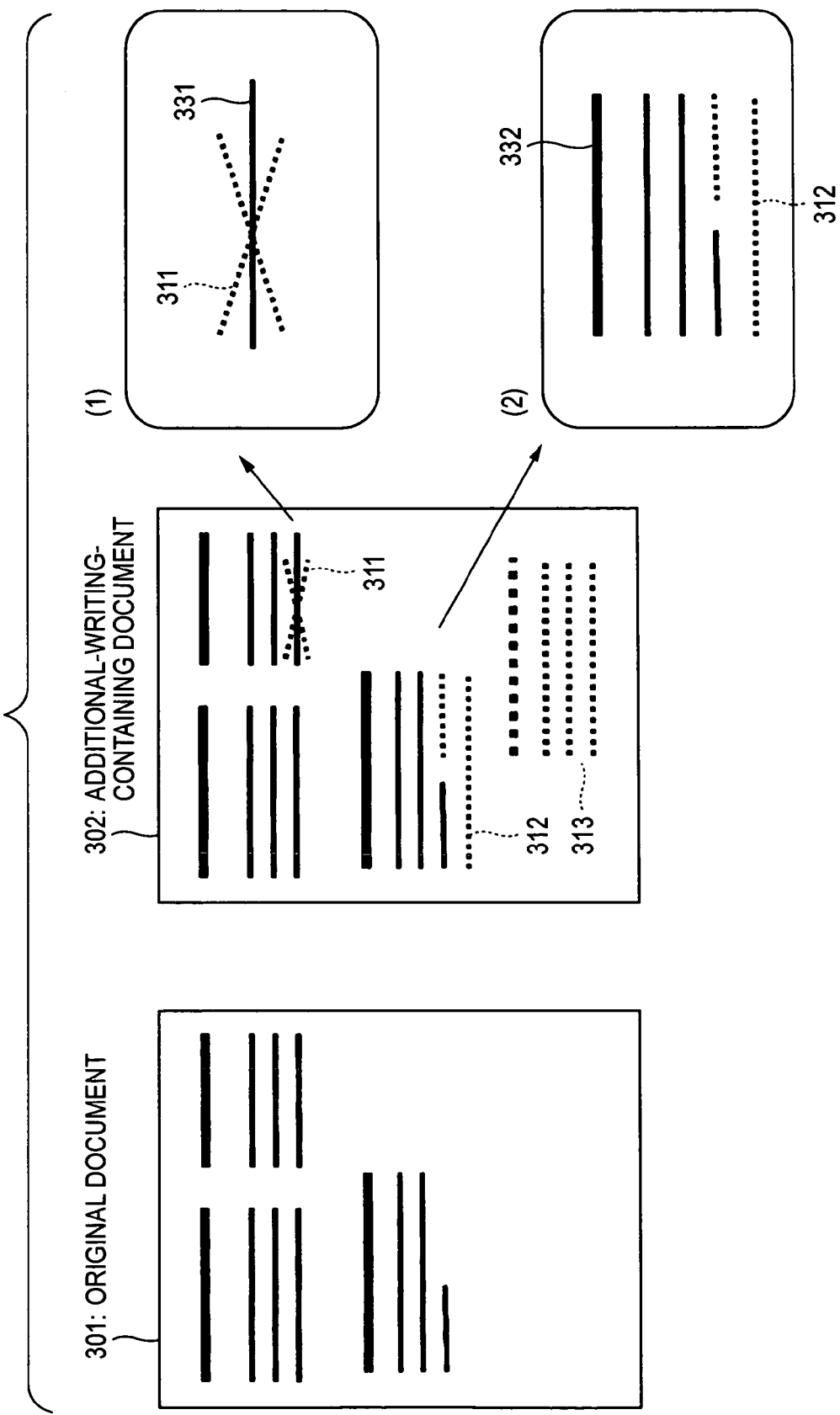
FIG. 6 is an explanatory view illustrating an example of a process performed by the change region state judging unit of the image processing apparatus according to the embodiment.

For example, in the case (1) where the overlapping portion between the original image and the change region is detected and where highly tamperable additional writing information is detected, the change region peripheral area analysis unit 231 first extracts the change region (corresponding to the additional writing information) shown in (1) of FIG. 6. The additional writing information 311 shown in (1) of FIG. 6 includes the overlapping portion of an area representing the original information 331, that is, includes the overwritten portion. Thus, in a case where the additional writing information has an overlapping portion, which overlaps with the original information, the change region peripheral area analysis unit 231 selects such additional writing information. In such a case, the change region tamperability judging unit 232 judges that this additional writing information is highly likely to tamper the original.

Further, in the case (2) where highly tamperability additional writing information is detected according to the original information that is present in the change region or in the vicinity thereof, the change region peripheral area analysis unit 231 first extracts, for instance, the change region (or the additional writing information) shown in (2) of FIG. 6. Original information 332 is present in the vicinity of the additional writing information 312 shown in (2) of FIG. 6. Thus, in a case where an area representing the original information is in contact with or is present in the vicinity of an area representing the additional writing information, the change region peripheral area analysis unit 231 selects such additional writing information. The change region tamperability judging unit 232 compares an information amount (the number of pixels) of the original information, which represents an area put into contact with an area representing the additional writing information, with a predetermined threshold value. In a case where the following inequality holds:

(the information amount (or the number of pixels) of the original information (or the area representing the original information)≧the threshold value, the change region tamperability judging unit 232 judges that this additional writing information is highly likely to tamper the original. A result of judgment made by the change region tamperability judging unit 232 is outputted to the warning display control unit 240.

Next, the judgment process performed by the layout analysis unit 235, the change region peripheral area analysis unit 236, and the change region tamperability judging unit 237 shown in FIG. 5 is described below. This process is performed as a process of detecting the case (c) where a change is performed on information representing each layout unit or the vicinity thereof.

The layout analysis unit 235 inputs image data representing a document to be analyzed, and then performs layout analysis on the document. Incidentally, in a case where the document to be analyzed includes layout information as attribute information, this information may be applied thereto. Conversely, in a case where the document to be analyzed does not include layout information, the layout analysis may be performed according to the image data representing the document to be analyzed. Incidentally, the layout analysis performed at the layout analysis unit 235 is region analysis performed on a character region, a photograph region, and the like. The main purpose of this layout analysis is the discrimination between a margin position and a non-margin position.

Figure 7:
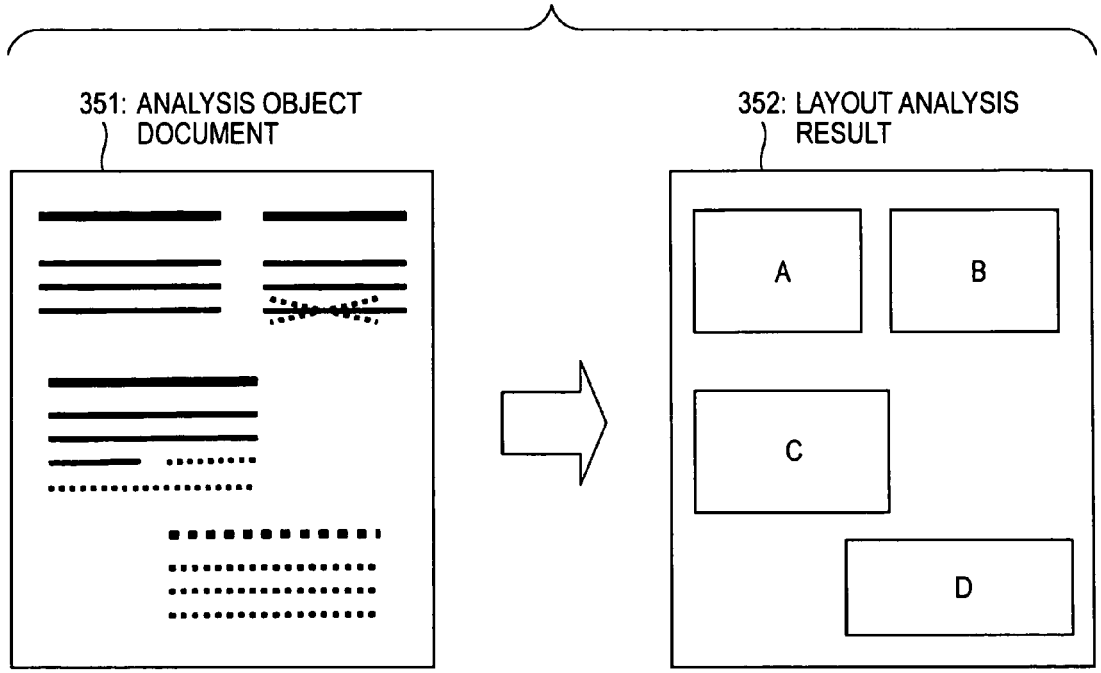
FIG. 7 is an explanatory view illustrating an example of a process performed by the change region state judging unit of the image processing apparatus according to the embodiment.

For instance, the analysis is performed on the regions, such as the character region and the photograph region, in a document 351 to be analyzed, which is shown in FIG. 7. Thus, for example, a result 352 of the layout analysis is data obtained by discriminating the regions, such as the character region and the photograph region, included in the document 351 and extracting layout units A to D.

The change region peripheral area analysis unit 236 and the change region tamperability judging unit 237 perform the processes in each layout unit analyzed by the layout analysis unit 235. The processes are similar to those performed by the change region peripheral area analysis unit 231 and the change region tamperability judging unit 232, which have been described by referring to FIG. 6. Results of the processes indicate whether the layout units A to D include the highly tamperable additional writing information. Results of the judgment performed by the change region tamperability judging unit 237 are outputted to the warning display control unit 240.

Next, the process performed by the warning display control unit 240 is described below. The warning display control unit 240 performs a display control operation of displaying the additional writing information, which is highly likely to tamper the original, in distinction from other pieces of additional writing information.

For instance, the additional writing information, which is highly likely to tamper the original, is indicated in the following modes (a) to (c):

(a) a color used for indicating this additional writing information is set to be a display color differing from colors used for indicating other pieces of additional writing information;

(b) a distinguishing mark indicating the additional writing information, which is highly likely to tamper the original, is displayed; and (c) an idea balloon indicating a warning message is displayed. Thus, the warning display control unit 240 performs a display control operation so that a user can discriminate the additional writing information, which is highly likely to tamper the original. Incidentally, this setting of the mode may be performed by a user who inputs data. Alternatively, the setting of such a mode may preliminarily be performed by default.

Figure 8B:
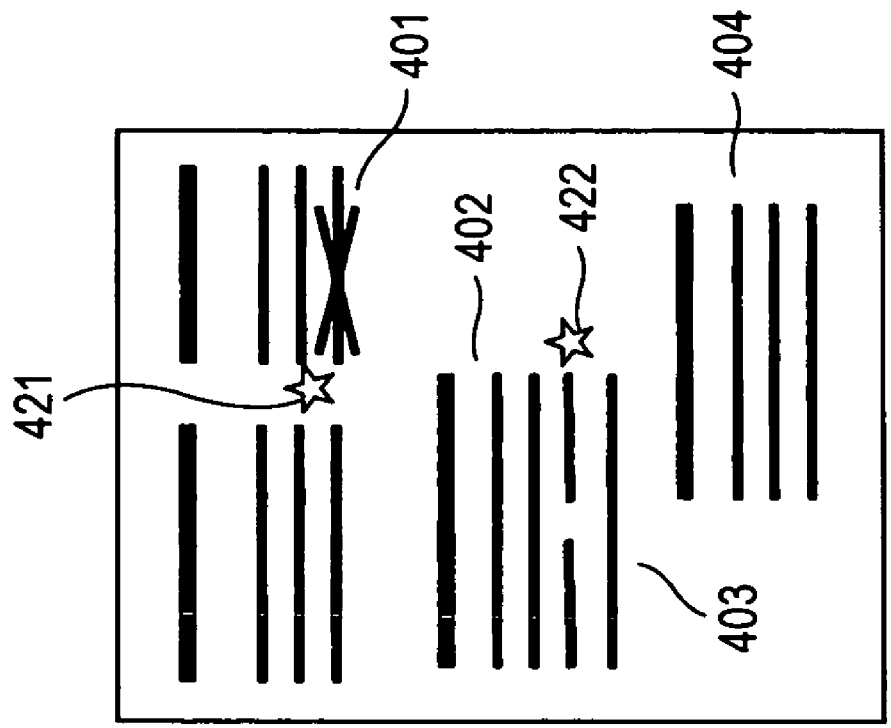
Figure 8A:
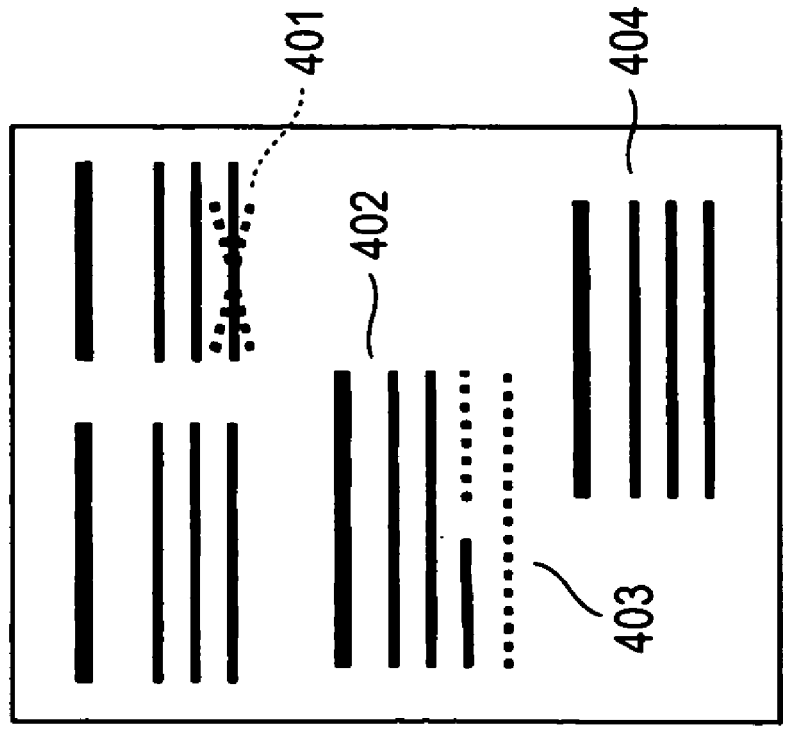

The image/data output unit 250 indicates display control data used in the warning display control unit 240. FIGS. 8A to 8C show examples of display data, and respectively illustrate the following display modes (a) to (c) in which the additional writing information judged to be highly tamperable is indicated:

(a) a color used for indicating this additional writing information is set to be a display color differing from colors used for indicating other pieces of additional writing information;

(b) a distinguishing mark indicating the highly tamperable additional writing information is displayed; and (c) an idea balloon indicating a warning message is displayed.

FIG. 8A shows an example of display set so that a color used for indicating the highly tamperable additional writing information differs from colors used for indicating other pieces of additional writing information. An output display image includes areas representing the original information and a plurality of pieces of additional writing information. It is assumed that four pieces of additional writing information 401 to 404 shown in this figure are detected, and that among these pieces of additional writing information, by the detection process, the pieces 401 and 403 of additional writing information are judged to be highly tamperable. In this case, only the pieces 401 and 403 of additional writing information are displayed in a color, for example, red differing from a color used for displaying other pieces of additional writing information. Incidentally, in this figure, dashed lines representing the pieces 401 and 403 of additional writing information indicate that these pieces of additional writing information are display in red.

FIG. 8B shows an example of displaying the additional writing information, which is judged to be highly tamperable, by indicating this additional writing information with a distinguishing mark thereto. Although the output display image includes areas representing the original information and the plurality of additional writing information, the pieces 401 and 403 of the highly tamperable additional writing information are indicated by displaying the distinguishing mark in the vicinity of each of the pieces 401 and 403. In the case of the example shown in this figure, the pieces of the highly tamperable additional writing information are indicated by displaying asterisk distinguishing marks 421 and 422.

FIG. 8C shows an example of displaying the additional writing information, which is judged to be highly tamperable, by indicating an idea balloon in which a warning message is described. Although the output display image includes areas representing the original information and the plurality of additional writing information, the pieces 401 and 403 of the highly tamperable additional writing information are indicated by displaying the idea balloons, in each of which a warning message is described, corresponding to the pieces 401 and 403.

Thus, under the control of the warning display control unit 240, the highly tamperable additional writing information is displayed in distinction from other pieces of information. This enables the apparatus to warn a user of the presence of the highly tamperable additional writing information.

Figure 9:
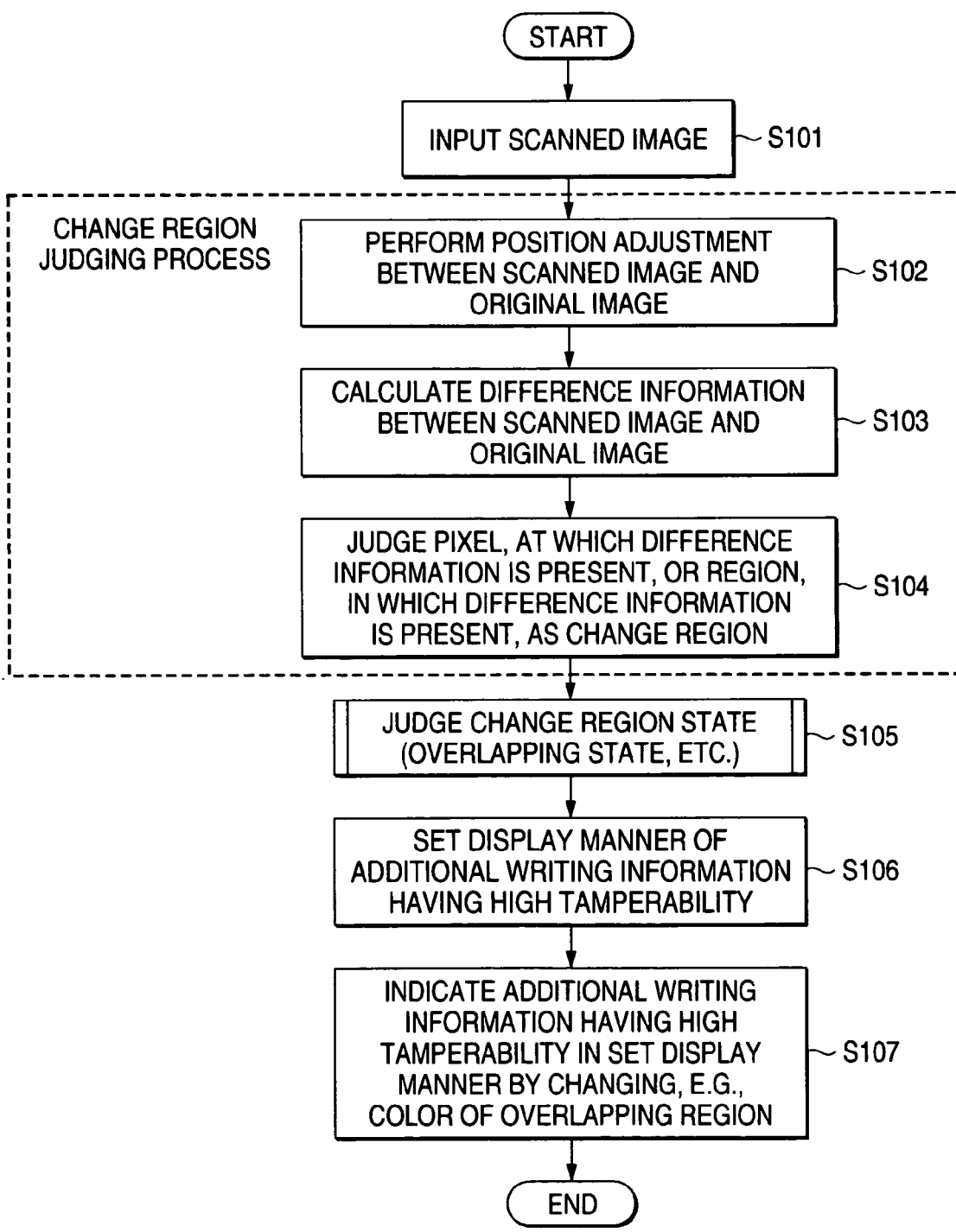
FIG. 9 is a flowchart illustrating a processing sequence performed by the image processing apparatus according to the embodiment.

Next, a process sequence performed by the image processing apparatus according to the embodiment is described below by referring to flowcharts shown in FIG. 9 and so forth. FIG. 9 shows a process flow including steps S102 to S104, which illustrates a process performed by the change region judging unit 220 in the case (a) where the original document or the original image is present, as described with reference to FIG. 4.

In step S101, a scanned image is inputted. This operation is performed by the image input unit 210 shown in FIG. 3. Image data to be analyzed, for example, data representing an additional-writing-containing document, or data representing an original document and an additional-writing-containing document is inputted. Incidentally, such data may be inputted not only from the scanner but from a database provided in a hard disk.

The process including steps S102 to S104 is performed by the change region judging unit 220. Incidentally, the change region judging unit 220 performs the process to be performed in the case (a) where the original document or the original image is present, which process has been described with reference to FIG. 4. First, in step S102, the adjustment of the position between the scanned image (the additional writing containing document) and the original image is performed. In step S103, the difference between the scanned image and the original image is calculated. In step S104, a pixel at which difference information is present, or a region including such a pixel is judged as a change region.

The process in step S105 is performed by the change region state judging unit 230. As described with reference to FIG. 5, there are the following detection modes (a), (b), and (c) serving as the processing modes of the change region state judging unit 230:

(a) the judging unit 230 detects a case where an overwrite change is performed on information representing an element in an input image;

(b) the judging unit 230 detects a change performed on information representing the vicinity of an element in an input image; and (c) the judging unit 230 detects a change performed on information representing each layout unit of an element or the vicinity thereof in an input image. The processes performed in the cases (a) and (b) are to detect the changes due to the overwrite and the additional writing, which are performed on the information representing an element, for example, a character or a figure in the input image, in units of such information. Judgment processing is performed by the change-region peripheral area analysis unit 231 and the change region tamperability judging unit 232 shown in FIG. 5. The process performed in the case (c) is to detect a change performed on information representing each layout unit of the element or the vicinity thereof in the input image. The process configuration of the change region state judging unit 230 is adapted to analyze the additional writing information in each layout unit detected by analysis of regions, such as a character region and a photograph region. In the case of performing the process corresponding to the case (c), the judgment process is performed by a layout analysis unit 235, the change-region peripheral area analysis unit 236, and the change region tamperability judging unit 237 shown in FIG. 5.

Figure 10B:
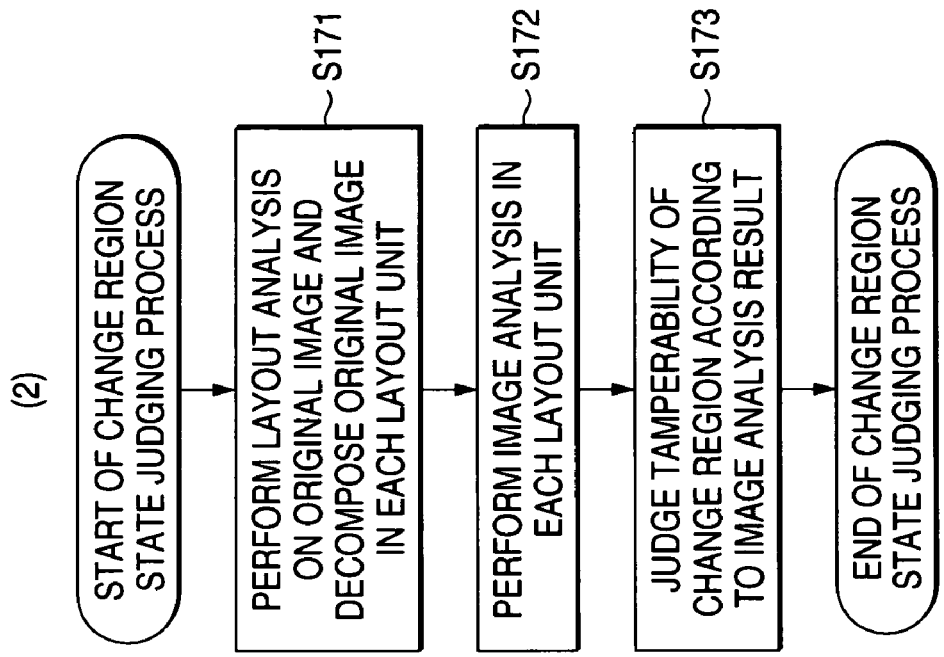
FIGS. 10A and 10B are flowcharts respectively illustrating processing sequences performed by the image processing apparatus according to the embodiment.
Figure 10A:
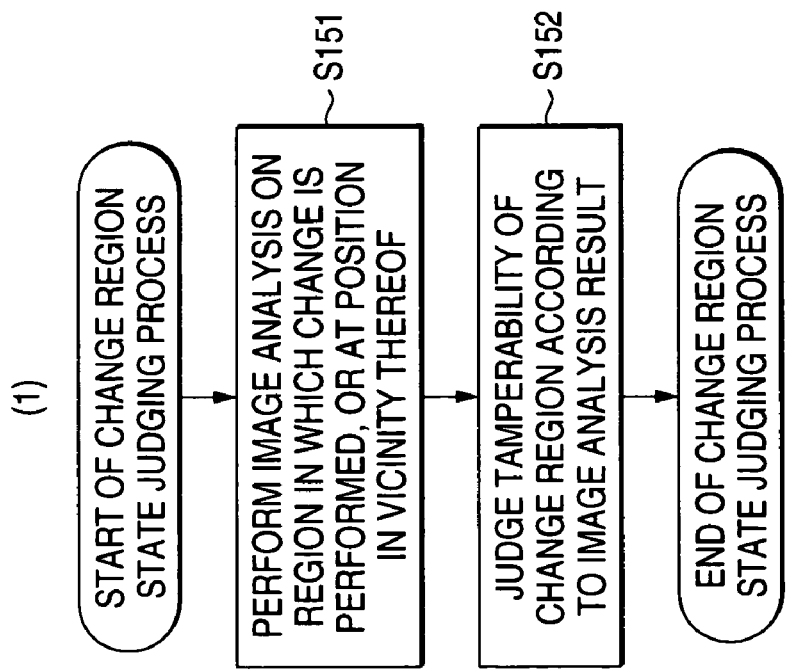

Such process sequences are described below by referring to a flowchart shown in FIGS. 10A and 10B. FIG. 10A illustrates the process sequence of processes performed in the cases (a) and (b), that is, (a) the judging unit 230 detects the case where an overwrite change is performed on information representing an element in the input image; and (b) the judging unit 230 detects a change performed on information representing the vicinity of an element in the input image.

First, in step S151, image analysis is performed on the region, in which the change is conducted, or on the position in the vicinity of the region. This process is performed by the change region peripheral area analysis unit 231 shown in FIG. 5. The change region peripheral area analysis unit 231 performs analysis on pixels included in the original image, which are located in the change region including the additional writing information detected by the change region judging unit 220 or in the vicinity thereof.

The practical examples of the process are the same as described with reference to FIG. 6. The change region peripheral area analysis unit 231 performs the following two operations:

(1) an overlapping portion between the original image and the change region is detected; and (2) original information representing original data, which is present in the change region or the vicinity thereof, is analyzed.

Subsequently, in step S152, according to results of the image analysis, the tamperability of the additional writing information is judged. For example, in the case (1) where the overlapping portion between the original image and the change region is detected and where highly tamperable additional writing information is detected, the change region peripheral area analysis unit 231 first extracts the change region (corresponding to the additional writing information) shown in (1) of FIG. 6. The additional writing information 311 shown in (1) of FIG. 6 includes the overlapping portion of an area representing the original information 331, that is, includes the overwritten portion. Thus, in a case where the additional writing information has an overlapping portion, which overlaps with the original information, the change region peripheral area analysis unit 231 selects such additional writing information. In such a case where the additional writing information has the overlapping portion, the change region tamperability judging unit 232 judges that this additional writing information is highly likely to tamper the original.

Further, in the case (2) where highly tamperable additional writing information is detected according to the original information that is present in the change region or in the vicinity thereof, the change region peripheral area analysis unit 231 first extracts, for instance, the change region (or the additional writing information) shown in (2) of FIG. 6. Original information 332 is present in the vicinity of the additional writing information 312 shown in (2) of FIG. 6. Thus, in a case where an area representing the original information is in contact with or is present in the vicinity of an area representing the additional writing information, the change region peripheral area analysis unit 231 selects such additional writing information. The change region tamperability judging unit 232 compares an information amount (the number of pixels) of the original information, which represents an area put into contact with an area representing the additional writing information, with a predetermined threshold value. In the case where (the information amount (or the number of pixels) of the original information-(or the area representing the original information)≧the threshold value, the change region tamperability judging unit 232 judges that this additional writing information is highly likely to tamper the original. A result of judgment made by the change region tamperability judging unit 232 is outputted to the warning display control unit 240.

Next, the process sequence to be performed in the case (c), in which a change is performed on information representing each layout unit or the vicinity thereof, is described below by referring to FIG. 10B. This process is to detect the case where a change is performed on information representing each layout unit or the vicinity thereof. Thus, the analysis of the additional writing information is performed in each layout unit detected by the analysis of the regions, such as the character region and the photograph region. This process is performed by the judgment process performed by the layout analysis unit 235, the change region peripheral area analysis unit 236, and the change region tamperability judging unit 237 shown in FIG. 5.

First, in step S171, document layout analysis is performed. Incidentally, in a case where the document to be analyzed includes layout information as attribute information, this information may be applied thereto. Conversely, in a case where the document to be analyzed does not include layout information, the layout analysis may be performed according to the image data representing the original document or the additional-writing-containing document. For instance, the result 352 of the layout analysis, which has been described and shown in FIG. 7, is obtained. The result 352 of the layout analysis is obtained by discriminating the regions, such as the character region and the photograph region, included in the document 351 and extracting layout units A to D.

Subsequently, in step S172, the analysis of the change region including the additional writing information is performed on each analyzed layout unit. This process is similar to the process performed in step S151 and includes, for example, the following two processes:

(1) an overlapping portion between the original image and the change region is detected; and (2) original information representing original data, which is present in the change region or the vicinity thereof, is analyzed.

Subsequently, in step S173, according to results of the image analysis, the tamperability of the additional writing information is judged. This process is similar to the process performed in step S152, and includes, for example, the process of detecting the overlapping portion between the original image and the change region and the process of detecting the highly tamperable additional writing information according to the original information that is present in the change region or the vicinity thereof. Practically, the comparison between the information amount (the number of pixels) of the original information, which represents an area put into contact with an area representing the additional writing information, with a predetermined threshold value is performed. In the case where (the information amount (or the number of pixels) of the original information (or the area representing the original information)≧the threshold value, such a calculation/judgment operation is performed.

Upon completion of the aforementioned change region state judgment process, the apparatus advances to step S106 in the flowchart shown in FIG. 9. In step S106, the warning display control unit 240 performs the process of setting a display mode in which the highly tamperable additional writing information.

For example, the additional writing information, which is highly likely to tamper the original, is indicated in the following modes (a) to (c):

(a) a color used for indicating this additional writing information is set to be a display color differing from colors used for indicating other pieces of additional writing information;

(b) a distinguishing mark indicating the additional writing information, which is highly likely to tamper the original, is displayed; and (c) an idea balloon indicating a warning message is displayed. Thus, the warning display-control unit 240 sets a display mode enabling a user to discriminate the additional writing information, which is highly likely to tamper the original. Incidentally, this setting of the mode may be performed by a user who inputs data.

Subsequently, in step S107, the image/data output unit 250 indicates display control data according to the information display mode determined in step S106. The image/data output unit 250 performs a display operation as described by referring to, for instance, FIGS. 8A to 8C. That is, as illustrated in FIGS. 8A to 8C, the image/data output unit 250 indicates the additional writing information, which is judged to be highly tamperable, in the following display modes (a) to (c):

(a) a color used for indicating this additional writing information is set to be a display color differing from colors used for indicating other pieces of additional writing information;

(b) a distinguishing mark indicating the highly tamperable additional writing information is displayed; and (c) an idea balloon indicating a warning message is displayed. Thus, the highly tamperable additional writing information is displayed in distinction from other pieces of information. This enables the apparatus to warn a user of the presence of the highly tamperable additional writing information.

Next, the process to be performed by the change region judging unit 220 in the case (b), in which the original document or the original image is absent, as described with reference to FIG. 4 is described by referring to FIG. 11.

The process flow shown in FIG. 11 differs from the process flow shown in FIG. 9 in a process including steps S202 to S204. Processes performed in other steps S201, and S205 to S207 are similar to those performed in steps S101, and S105 to S107 of the process flow shown in FIG. 9. Therefore, the description of the processes performed in steps S201, and S205 to S207 is omitted herein.

The process to be performed in steps S202 to S204, that is, the process to be performed by the change region judging unit 220 in the case (b), in which the original document or the original image is absent, as described with reference to FIG. 4 is described below.

In the case where the original document or the original image is absent, the extraction of the difference between the original document image and the additional-writing-containing document image cannot be performed. Therefore, the process of extracting data, which is judged as additional writing information, only from an additional-writing-containing document is performed. In step S202, the image analysis (or the color analysis) is performed on the additional-writing-containing document to thereby extract a color used in the additional-writing-containing document. For instance, a result of the analysis, which represents black or red, is obtained.

Subsequently, in step S203, color information to be discriminated as additional writing information is inputted. For example, color information, such as information representing red, is inputted by an operator. Incidentally, the apparatus may be adapted so that, for example, the color information representing a color other than black is judged as additional writing information, without inputting color information by an operator. In the case of this configuration, it is unnecessary to externally input color information.

Subsequently, in step S203, a pixel having a designated color from an additional-writing-containing document according to a result of the image analysis (or the color analysis) performed on the additional-writing-containing document and to the color information inputted in step S202 or to the preliminarily set color information. Alternatively, a rectangular region including a pixel having a designated color is extracted.

Processes to be performed in step S205 or later are similar to those performed in step S105 or above in the process flow shown in FIG. 9.

The image processing apparatus according to the embodiment performs the extraction of additional writing information and judges whether the extracted additional-writing information aims at tampering the original. Further, the image processing apparatus indicates the additional writing information, which is judged to be highly tamperable, in distinction from other pieces of additional writing information and the original information, for example, in the following display modes (a) to (c):

(a) a color used for indicating this additional writing information is set to be a display color differing from colors used for indicating other pieces of additional writing information;

(b) a distinguishing mark indicating the highly tamperable additional writing information is displayed; and (c) an idea balloon indicating a warning message is displayed. Thus, the apparatus can warn a user of the presence of the highly tamperable additional writing information.

Finally, an example of the hardware configuration of the image processing apparatus according to the embodiment is described below by referring to FIG. 12. The configuration of the image processing apparatus shown in FIG. 12 includes, for example, a PC, a data reading portion such as a scanner 531, and a data output portion such as a printer 532.

A CPU (Central Processing Unit) 501 serves as a control portion performs processing according to computer programs that describe execution sequences of various kinds of data processing described in the foregoing description of the embodiment of the embodiment, that is, the change region judging process, the change region state judging process, and the warning display control process.

A ROM (Read-Only Memory) 502 stores programs and operation parameters used by the CPU 501. A RAM (Random Access Memory) 503 stores programs used in execution by the CPU 501 and also stores parameters adapted to appropriately change in the execution. These constituents are connected to one another through a host bus 504 including a CPU bus.

The host bus 504 is connected to an external bus such as a PCI (Peripheral Component Interconnect/Interface) bus through a bridge 505.

A keyboard 508 and a pointing device 509 are input devices operated by users. A display unit 510 includes a liquid crystal display unit or a CRT (Cathode-Ray Tube) and indicates various kinds of information as texts and image information.

A HDD (Hard Disk Drive) 511 incorporates and drives a hard disk and records and reproduces programs, which are executed by the CPU 501, and information. The hard disk stores input data representing the original document and the additional-writing-containing document. Additionally, the hard disk also stores various kinds of computer programs, such as data processing programs.

A drive unit 512 reads data or programs recorded on mounted removable recording media, such as a magnetic disk, an optical disk, a magneto-optical disk, or a semiconductor memory. The drive unit 512 also supplies the read data or programs to the RAM 503 through the interface 507, the external bus 506, the bridge 505, and the host bus 504. The removable recording media 521 can be utilized as a data recording region similar to the hard disk.

A connection port 514 is a port to which external connection devices 522 and has USB and IEEE-1394 connection portions. The connection port 514 is connected to the CPU 501 through the interface 507, the external bus 506, the bridge 505, and the host bus 504. A communication portion 515 is connected to a network, and performs data communication processing to external devices. The data reading portion 531 performs a document reading process. The data output portion 532 performs a document data output process.

Figure 12:
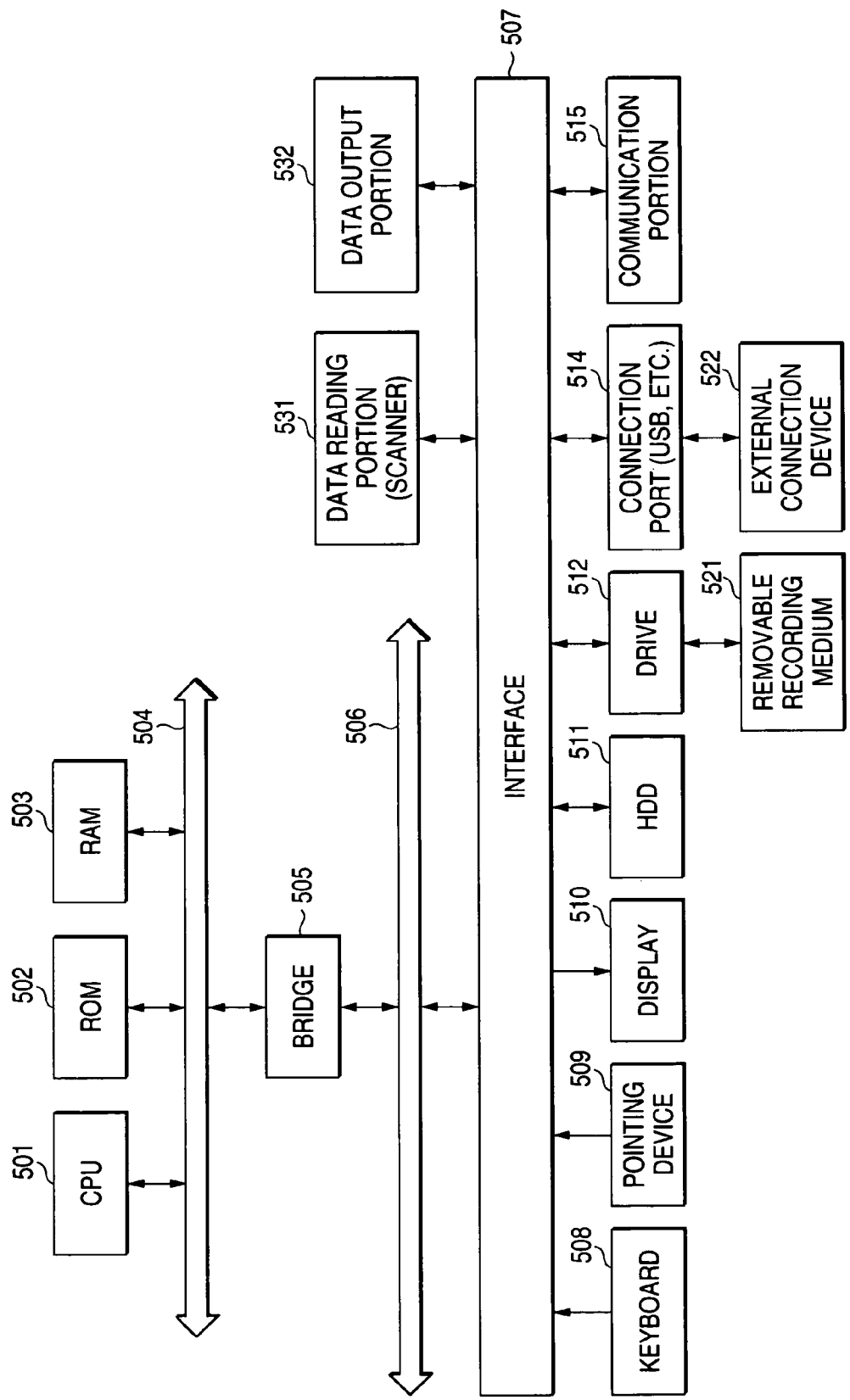
FIG. 12 is an explanatory view illustrating the hardware configuration of the image processing apparatus according to the embodiment.

Incidentally, the example of the hardware configuration of the image processing apparatus shown in FIG. 12 is only illustrative. The configuration of the image processing apparatus is not limited to that shown in FIG. 12. Any configuration may be employed as that of the image processing apparatus, as long as the image processing apparatus can perform the processes described in the foregoing description of the embodiment.

The invention has been described in detail by referring to the embodiment. However, it is apparent to those skilled in the art that modifications and alternatives of the embodiment can be made without departing from the gist of the invention. That is, the invention has exemplificatively been disclosed and should not be interpreted limitedly. To comprehend the gist of the present invention, the appended claims should be considered. To comprehend the gist of the invention, the scope of the appended claims should be taken into consideration.

The sequence of processes described in the present specification may be executed by hardware, software, or a combination of both of hardware and software. In the case of performing the process by software, the process may be performed by installing a program, in which a process sequence is recorded, in a memory in a computer incorporated into dedicated hardware or by installing the program in a general-purpose computer capable of performing various processes.

For example, the program may preliminarily be recorded on a hard disk or a ROM (a read-only memory), which serves as a recording medium. Alternatively, the program may temporarily or permanently be stored (recorded) on a removable recording medium such as a flexible disk, a CD-ROM (a compact-disk read-only memory), a MO (a magneto-optical disk), a DVD (a digital versatile disk), a magnetic disk, and a semiconductor memory. The removable recording media may be provided as what is called-package software.

Incidentally, the program may be installed in a computer from the aforementioned removable recording medium. Alternatively, the program may be wirelessly transferred to the computer from a download site. Alternatively, the program may be wire-transferred to the computer through a network such as the Internet, and may be installed in an incorporated recording medium, such as a hard disk, of the computer that has received the program transferred in such a manner.

According to the above-embodiment, the change region judging unit is configured to perform a judging process on a change region, which includes a pixel area to be discriminated to represent additional writing information, according to difference among a plurality of pieces of input image data.

According to the above-embodiment, the change region judging unit is configured to perform a judging process on a change region, which includes a pixel area to be discriminated to represent additional writing information, according to color information included in one piece of the input image data.

According to the above-embodiment, the change region state judging unit is configured to perform, when image analysis is performed on an area judged by the change region judging unit to be a change region, an operation of detecting an overlapping portion between an original image and the change region and also configured to perform an operation of judging additional writing information represented by a change region, which has an overlapping portion with original information, to be highly tamperable additional writing information.

According to the above-embodiment, the change region state judging unit is configured to perform, when image analysis is performed on an area judged by the change region judging unit to be a change region, an operation of analyzing original information, which is present in the change region or in vicinity thereof, and also configured to perform comparison between an amount of or the number of pixels representing the original information and a predetermined threshold value and to perform, when the amount of or the number of pixels representing the original information is equal to or more than the threshold value, an operation of judging additional writing information included in a change region to be highly tamperable additional writing information.

According to the above-embodiment, the change region state judging unit is configured to perform an image analysis process on an area, which is judged by the change region judging unit to be a change region, in each layout unit.

According to the above-embodiment, the warning display control unit is configured to perform an operation of setting highly tamperable additional writing information in a display mode enabling the highly tamperable additional writing information to be discriminated from other pieces of information.

According to the above-embodiment, the change region judging step is a step of performing a judging process on a change region, which includes a pixel area to be discriminated to represent additional writing information, according to difference among a plurality of pieces of input image data.

According to the above-embodiment, the change region judging step is a step of performing a judging process on a change region, which includes a pixel area to be discriminated to represent additional writing information, according to color information included in one piece of the input image data.

According to the above-embodiment, the change region state judging step is adapted to perform, when image analysis is performed on a change region detected as a result of judgment in the change region judging step, an operation of detecting an overlapping portion between an original image and the change region and also adapted to perform an operation of judging additional writing information represented by a change region, which has an overlapping portion with original information, to be highly tamperable additional writing information.

According to the above-embodiment, the change region state judging step is adapted to perform, when image analysis is performed on a change region as a result of judgment in the change region judging step, an operation of analyzing original information, which is present in the change region or in vicinity thereof, and also configured to perform comparison between an amount of or the number of pixels representing the original information and a predetermined threshold value and to perform, when the amount of or the number of pixels representing the original information is equal to or more than the threshold value, an operation of judging additional writing information included in a change region to be highly tamperable additional writing information.

According to the above-embodiment, the change region state judging step is adapted to perform an image analysis process on a change region, which is detected as a result of judgment in the change region judging step, in each layout unit.

According to the above-embodiment, the warning display control step is adapted to perform an operation of setting highly tamperable additional writing information in a display mode enabling the highly tamperable additional writing information to be discriminated from other pieces of information.

Incidentally, the computer program according to the embodiment can be provided to a computer system enabled to execute various program codes in computer readable forms by using storage media and communication media, for example, recording media, such as CD, FD, and MO, and a communicating medium such as a network. A process is implemented on the computer system according to such a program by proving the program thereto in the computer readable form.

The apparatus and the method according to the embodiment are configured so that a change region including an area to be judged to have additional writing information representing an additional writing is extracted according to input image data, that image analysis is performed on the extracted change region to thereby judge the presence/absence of additional writing information aiming at tampering with a document, and that display enabling the discrimination of additional writing information judged to be highly likely to tamper the document is performed according to a result of the judgment. Thus, a user can be notified of the presence of the additional writing information having high tamperability and can be warned.

The apparatus and the method according to the embodiment are configured so that whether the additional writing information aims at tampering with a document is judged by detecting the overlapping portion between the original image and the change region and by analyzing original information, which is present in the change region or in the vicinity thereof. This enables efficient detection of additional writing information supposed to aim at tampering with the document.

Incidentally, various processes having been described in the present specification are chronologically performed according to the description. Alternatively, the processes may be performed in parallel or individually depending on the throughput of an apparatus adapted to perform the processes, or depending on need. Additionally, in the present specification, the system is a logical set of a plurality of devices and is not limited to a system, the devices of which are placed in the same casing.

As described above, the apparatus and the method according to the embodiment are configured so that a change region including an area to be judged to have additional writing information representing an additional writing is extracted according to input image data, that image analysis is performed on the extracted change region to thereby judge the presence/absence of additional writing information aiming at tampering a document, that display enabling the discrimination of additional writing information judged to be highly likely to tamper the original document is performed according to a result of the judgment, and that a user can be notified of the presence of the additional writing information having high tamperability and can be warned. Consequently, a system enabled to perform improved extraction of additional information and to verify tampering is realized.

The apparatus and the method according to the embodiment are configured so that whether the additional writing information aims at tampering with a document is judged by detecting the overlapping portion between the original image and the change region and by analyzing original information, which is present in the change region or in the vicinity thereof. This enables efficient detection of additional writing information supposed to aim at tampering with the document. Consequently, a system enabled to perform improved extraction of additional information and to verify tampering is realized.

What is claimed is:

1. An image processing apparatus comprising:
   a change region judging unit that performs a judging process on a change region according to input image data, the judging process including a pixel area discriminated to represent additional writing information;
   a change region state judging unit that performs image analysis on an area judged by the change region judging unit to be a change region, and that judges presence/absence of additional writing information to be used to tamper by detecting if original information is in the vicinity of the additional writing information;
   a warning display control unit adapted to set a display mode according to a result of judgment to enable additional writing information, which is highly likely to tamper, to be discriminated; and
   a display unit that performs an output data displaying process according to the display mode set by the warning display control unit;
   wherein the change region state judging unit is configured to perform, when the image analysis is performed on the area judged by the change region judging unit to be a change region, an operation of analyzing the original information, which is present in at least one of the change region and a region in vicinity of the change region; and
   wherein the change region state judging unit is configured to perform comparison between an amount of the original information at the region in vicinity of the change region and a predetermined threshold value.

2. The image processing apparatus according to claim 1, wherein the change region judging unit is configured to perform the judging process on the change region according to difference among a plurality of pieces of input image data.

3. The image processing apparatus according to claim 1, wherein the change region judging unit is configured to perform the judging process on the change region according to color information included in at least one piece of the input image data.

4. The image processing apparatus according to claim 1, wherein the change region state judging unit is configured to perform, when image analysis is performed on the area judged by the change region judging unit to be the change region, an operation of detecting an overlapping portion between the original information and the change region, and wherein the change region state judging unit is configured to perform an operation of judging additional writing information represented by the change region, which has the overlapping portion with the original information, to be the additional writing information that is highly likely to tamper.

5. The image processing apparatus according to claim 1, wherein the change region state judging unit is configured to perform, when the amount of the original information at the region in vicinity of the change region is equal to or more than the predetermined threshold value, an operation of judging additional writing information included in the change region as the additional writing information that is highly likely to tamper.

6. The image processing apparatus according to claim 1, wherein the change region state judging unit is configured to perform an image analysis process on an area, which is judged by the change region judging unit to be the change region, in a layout unit.

7. The image processing apparatus according to claim 1, wherein the warning display control unit is configured to perform an operation of setting the highly tamperable additional writing information in a display mode enabling the highly tamperable additional writing information to be discriminated from other pieces of information.

8. An image processing method, comprising:
   performing a judging process on a change region, which includes a pixel area discriminated to represent additional writing information, according to input image data;
   performing image analysis on a change region detected as a result of the judgment process;
   wherein performing the judging process further comprises performing, when the image analysis is performed on the area judged by the change region process to be a change region, an operation of analyzing the original information, which is present in the change region and a region in the vicinity of the change region;
   judging presence/absence of additional writing information to be used to tamper by detecting if original information is in the vicinity of the additional writing information;
   setting a display mode according to a result of the judgment process to enable highly tamperable additional writing information to be discriminated;
   performing an output data displaying process according to the display mode; and
   performing a comparison between an amount of the original information at the region in vicinity of the change region and a predetermined threshold value.

9. The image processing method according to claim 8, further comprising:
   performing the judging process on the change region according to difference among a plurality of pieces of the input image data.

10. The image processing method according to claim 8, further comprising:
    performing the judging process on the change region according to color information included in at least one piece of the input image data.

11. The image processing method according to claim 8, further comprising:
    detecting an overlapping portion between the original information and the change region when the judging process on the change region is performed; and
    judging additional writing information represented by the change region, which has the overlapping portion with the original information, to be the highly tamperable additional writing information.

12. The image processing method according to claim 8, further comprising:

analyzing the original information, which is present in at least one of the change region and a region in vicinity of the change region, when the image analysis is performed on the change region as a result of the judgment of the additional writing information;

comparing between an amount of the original information and a predetermined threshold value; and judging the additional writing information included in the change region to be highly tamperable additional writing information, when the amount of the original information is equal to or more than the predetermined threshold value.

13. The image processing method according to claim 8, further comprising:

performing an image analysis process on the change region, which is detected as a result of the judgment, in a layout unit.

14. The image processing method according to claim 8, further comprising:

setting highly tamperable additional writing information in a display mode enabling the highly tamperable additional writing information to be discriminated from other pieces of information.

15. A storage medium readable by a computer, the storage medium storing a program of instructions executable by the computer to perform image processing, comprising:

performing a judging process on a change region, which includes a pixel area discriminated to represent additional writing information, according to input image data;

performing image analysis on a change region detected as a result of the judgment process;

wherein performing the judging process further comprises performing, when the image analysis is performed on the area judged by the change region process to be a change region, an operation of analyzing the original information, which is present in the change region and a region in the vicinity of the change region;

judging presence/absence of additional writing information to be used to tamper by detecting if original information is in the vicinity of the additional writing information;

setting a display mode according to a result of the judgment process to enable highly tamperable additional writing information to be discriminated;

performing an output data displaying process according to the display mode; and performing a comparison between an amount of the original information at the region in vicinity of the change region and a predetermined threshold value.

16. The image processing apparatus according to claim 1, wherein the change region judging unit is configured to perform the judging process on the change region according to the color information included in only one piece of the input data.

17. The image processing method according to claim 8, further comprising:

performing the judging process on the change region according to color information included in only one piece of the input image data.

18. The image processing method according to claim 15, further comprising:

performing the judging process on the change region according to color information included in only one piece of the input image data.

* * * * *